United States Patent [19]

Weston

[11] 4,211,448
[45] Jul. 8, 1980

[54] ADJUSTABLE RACK ASSEMBLY

[76] Inventor: Robert M. Weston, P.O. Box 812, Bayou La Batre, Ala. 36509

[21] Appl. No.: 846,226

[22] Filed: Oct. 26, 1977

[51] Int. Cl.² ............................................. B60D 3/00
[52] U.S. Cl. .......................................... 296/3; 224/325
[58] Field of Search .................. 296/3, 10; 224/29 R, 224/42.01, 42.1 E, 42.42 R, 42.43, 42.45 R

[56] References Cited

U.S. PATENT DOCUMENTS

| | | | |
|---|---|---|---|
| 2,720,414 | 10/1955 | Hart | 296/3 X |
| 2,947,566 | 8/1960 | Tower | 296/3 X |
| 3,765,713 | 10/1973 | Suitt | 296/3 |
| 4,057,281 | 11/1977 | Garett | 296/3 |

Primary Examiner—Robert B. Reeves
Assistant Examiner—Gene A. Church
Attorney, Agent, or Firm—Sughrue, Rothwell, Mion, Zinn and Macpeak

[57] ABSTRACT

An adjustable rack assembly for pick-up trucks and the like is readily adaptable to differing cab and bed configurations. The assembly includes a plurality of vertical posts, transverse rail members, longitudinal bars, and an overcab rack adjustably and releasably secured together.

2 Claims, 4 Drawing Figures

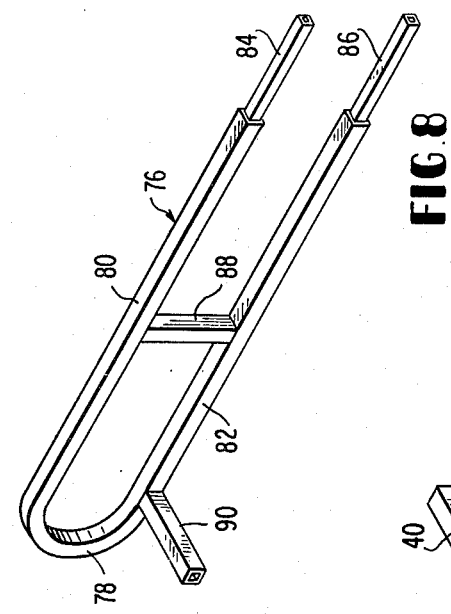
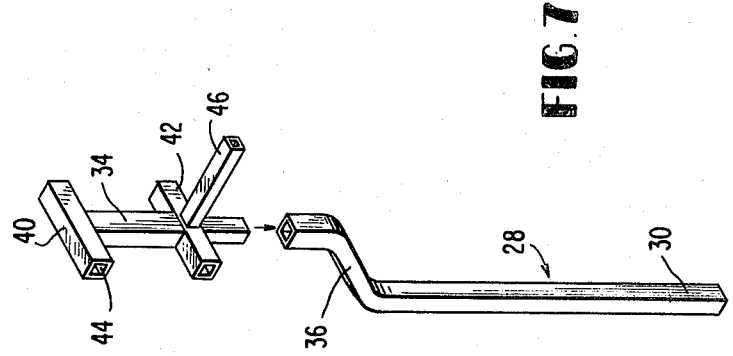
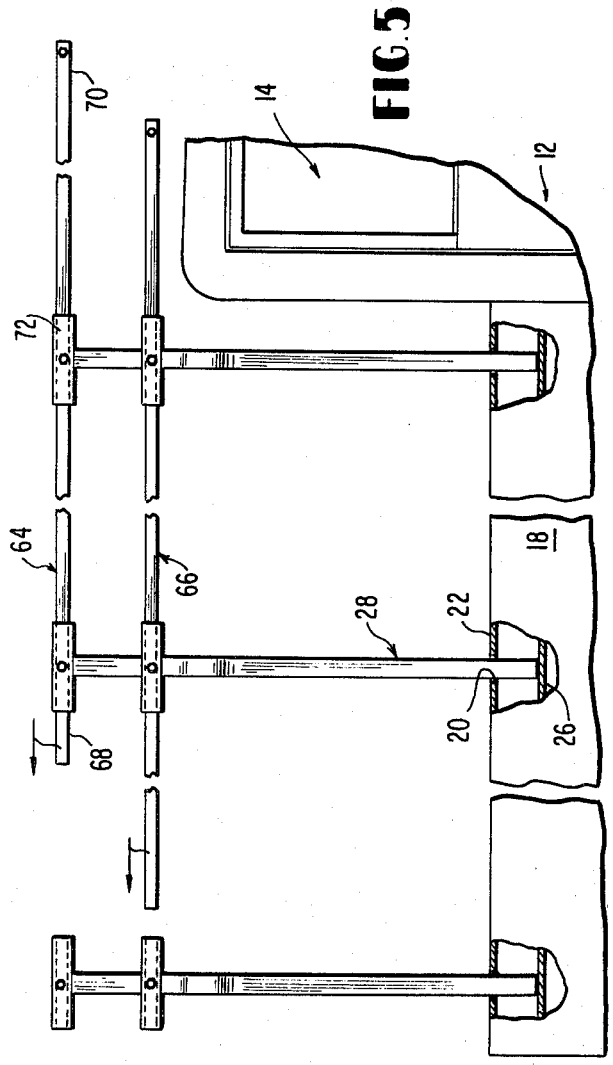
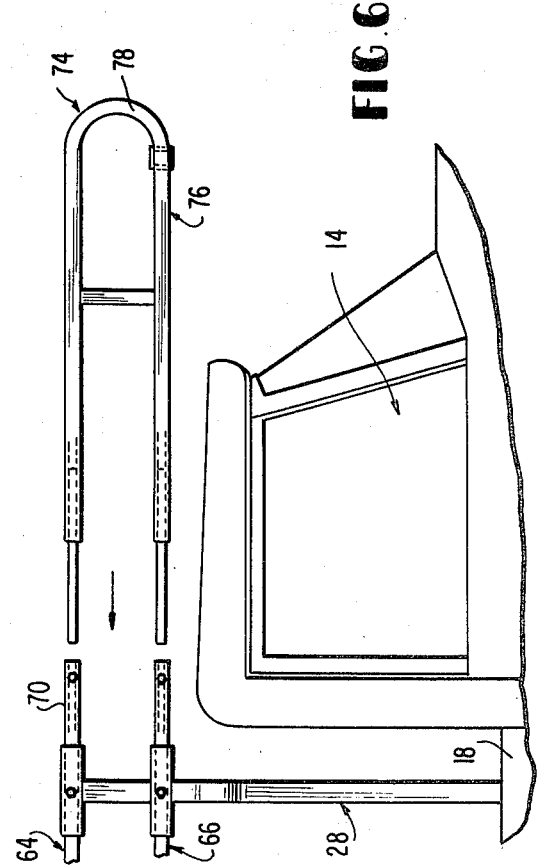

ically constructed, have end sections 68 provided with

ADJUSTABLE RACK ASSEMBLY

BACKGROUND OF THE INVENTION

1. Field of the invention:

This invention pertains to load supporting racks for trucks, particularly to a load support rack of universal applicability.

2. Statement of the Prior Art:

Prior proposals for truck racks, some of a universal nature have been advanced. Examples of known prior art are reflected in the below listed U.S. Patents.

| Patentee | Reg. No. | Date |
| --- | --- | --- |
| P. Tower | 2,947,566 | Aug. 2, 1960 |
| G. C. Hart | 2,720,414 | Oct. 11, 1965 |
| G. W. Clyatt | 3,224,805 | Dec. 21, 1965 |
| James L. Rinkle | 3,589,576 | June 29, 1971 |
| Clifford W. Gerguson | 3,594,035 | July 20, 1971 |
| Suitt | 3,765,713 | Oct. 16, 1973 |

SUMMARY OF THE INVENTION

The present invention pertains to a rack employed above a truck bed, particularly, the bed of a pick-up truck or the like. The rack is adaptable to installation on a wide variety of makes and models of trucks. These trucks typically are furnished with side panels and have sockets formed in said side panels. Such sockets serve several functions, and are principally provided for the purpose of insertion of stakes to increase the height of the side panels. There is substantial variance from model-to-model in the spacing and dimension of these sockets. The rack hereof is designed for insertion and maintenance within these sockets, and adapts the truck for hauling long and/or bulky objects on the rail (e.g., ladders, lumbers, pipe, etc). This allows the bed of the truck to be used for smaller items while hauling such bulky materials.

The rack assembly is rapidly assembled or disassembled and is easily repaired or replaced. When not in use, the rack may be temporarily removed. Disassembly may be accomplished without the necessity for special tools or equipment, and the disassembled unit is adapted for storage in a compact area.

The components of the unit are readily replaceable so that damage to a part of the assembly does not require discard of the entire assembly.

Other and further objects and advantages of the invention will become apparent to those skilled in the art from a consideration of the following specification when read in conjunction with the annexed drawings.

BRIEF DESCRIPTION OF THE DRAWINGS

FIG. 5 is a foreshortened side view of a truck with a rack hereof in place;

FIG. 6 is a side elevational view similar to FIG. 5 showing the overcab rack assembly of the invention;

FIG. 7 is a perspective view of one of the upright posts hereof; and

FIG. 8 is a perspective of a bracket—being one of the components of the overcab rack assembly.

DESCRIPTION OF THE PREFERRED EMBODIMENT

Figure 3:
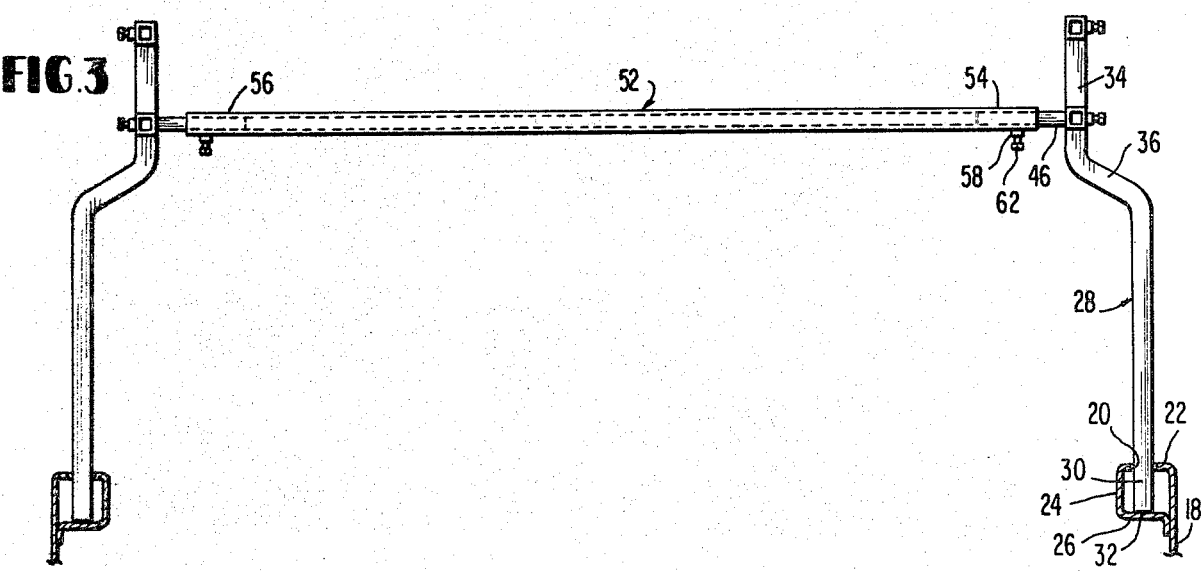
FIG. 3 is a view similar to FIG. 2 showing the components assembled and in place in the sockets of the truck panel sides (shown in section)

Referring to the drawing in more detail, a rack assembly according to this invention is therein generally identified by reference character 10. The assembly is shown in its principal environment of use applied to a pick-up truck 12 having a cab 14 and a cargo bed 16. The truck has side panels 18, provided at spaced intervals with socket openings 20 in the top panels 22 thereof. As best shown in FIG. 3, the panels include side walls 24, and imperforate bottom walls 26. This description of the truck per se is by way of illustration, it being a principal purpose of the invention that the rack hereof be applicable to a wide variety of such trucks, and it should be understood that the dimension and spacing of the sockets is variable as between different styles and makes of trucks.

The rack assembly 10 comprises a plurality of upright posts 28 each having a base end section 30 with a lower extremity 32, and a removable upper end section 34. The sockets 22 are arranged in transversely aligned pairs, and the lower end sections of the posts are inserted into the sockets, with the extremities 32 thereof engaging against the panel bottom walls 26. The upper end sections 34 of the posts each extend from an upwardly and inwardly inclined portion 36 of the posts 28, and the sections 34 each have , and an upright portion 38. A pair of vertically spaced, substantially tubular, horizontal top and bottom sleeves 40 and 42, respectively, are provided in the upright portions 38, and each has a passageway 44 extending therethrough. An inwardly extending horizontal stub shaft 46 is also provided on each post and is preferably located at the height of the bottom sleeve 42. It will be observed that, with the posts in place in the sockets, the respective sleeves are longitudinally aligned, and the stub shafts of each pair of posts extend toward one another in transverse alignment.

The sleeves 40 and 42 are provided with blocks 48 having threaded openings extending to the passageway 44, and screws 50 are threadedly engaged therein.

Figure 1:
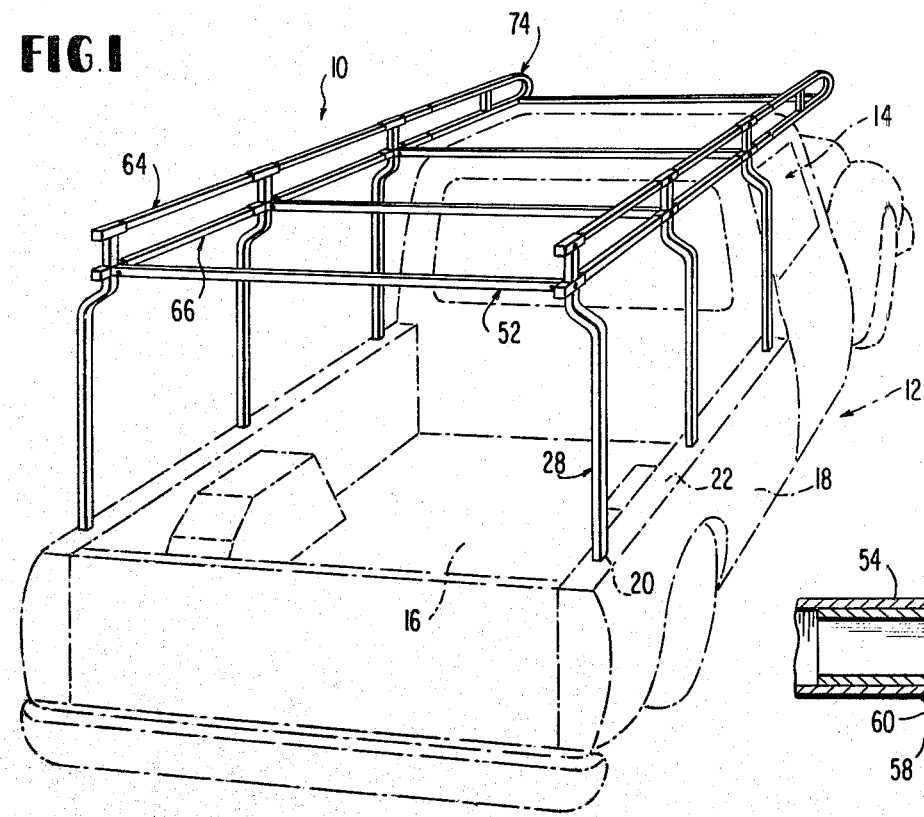
FIG. 1 is a perspective view of a rack constructed and assembled in accordance with this invention in place on a pick-up truck.
Figure 4:
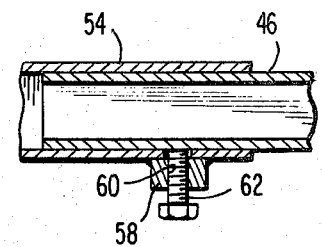
FIG. 4 is an enlarged detail cross section through a typical junction hereof.
Figure 2:
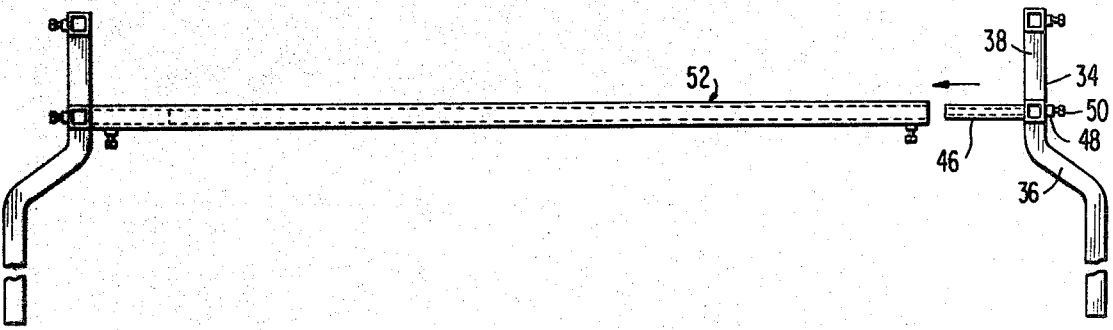
FIG. 2 is an enlarged elevational view, partially foreshortened and disassembled, of the rack showing assembly of the transverse rail members and upright posts thereof.

Extending transversely across the truck bed to span each of the pairs of posts 28 are elongated transverse rail members 52. The transverse rail members are tubular and have opposite open end sections 54, 56 each provided with blocks 58 fixedly secured thereto. Each block has a threaded opening 60 which extends through the end section as well, and a screw 62 is engaged therein. In FIG. 4 a typical connection of that type is shown. The stub shafts 46 are of reduced dimension by comparison to the transverse rail members, and are slideably engaged in the end sections thereof. When appropriately inserted to a depth such that the posts 28 are vertically oriented, the screws 62 are tightened thereagainst, thereby releasably locking the rails in place.

FIG. 5 of the drawing best illustrated the manner of installation of elongated, longitudinal upper and lower bar members 64 and 66 hereof. The bar members, identical to one another, each have first and second ends 68, 70, the second ends 70 having block and screw connectors of the type hereinbefore described. Each of the longitudinal bar members is adapted by dimension and configuration for slideable engagement in the top and bottom sleeves, respectfully. The installation procedure includes initially directing the first ends 68 of the bars through the leading end sleeves (denoted 72 in FIG. 5), and then through the successive aligned sleeves until fully inserted. The screws 50 are then tightened to releasably engage the bars in place.

The invention features an overcab assembly 74 comprising a pair of U-form brackets 76 shown individually in FIG. 8. Each bracket has a leading bight section 78 from which extend upper and lower bracket arms 80, 82. The arms have trailing, reduced shafts 84 and 86 and are rigidified by an intermediate vertical brace 88. The brackets further include an inwardly extending foot member 90 similar in configuration and dimension with the stub shafts 46, the former extending from the lower bracket arms 82. The reduced shafts 84 and 86 are telescopically received in the open ends 70 of the longitudinal bar members and clamped therein by the screw connectors. A transverse rail member 52 spans the foot members 90 and is also maintained in place by the screws 62 thereof.

I Claim:

1. An adjustable rack assembly for use with a truck having truck panel sides and a cab, the panel sides having a series of sockets therein, said sockets being arranged in laterally aligned pairs, the rack assembly comprising:

a plurality of vertical posts, each having a base end section, and removable upper end section, the base end sections being engaged in said sockets in transversely aligned pairs;

the removable upper end sections each including a pair of vertically spaced, substantially horizontal top and bottom sleeves on each of said removable upper end sections, said sleeves being longitudinally aligned on each side of the truck, and including leading end sleeves on the pair of vertical posts adjacent said cab;

an inwardly projecting horizontal stub shaft fixedly secured to said removable upper end sections in substantially right angular relation to said sleeves;

transverse rail members slidably engaged with said stub shafts of said removable upper end sections between said transverse pairs;

releasable screw connection means, including blocks fixedly secured to the rail members and sleeves, securing the rail members and stub shafts together;

elongated longitudinally extending bar members slidably engaged in an extending through the aligned horizontal sleeves and having open leading ends projecting forwardly of the leading end sleeves;

an overcab rack assembly comprising a pair of U-form brackets with upper and lower bracket arms, a leading bight section, and trailing reduce shafts;

said reduce shafts being telescopically engaged in said open leading ends of said longitudinally extending bar members;

an inwardly extending foot member on the lower bracket arm of each of said brackets; and a forward cross bar spanning said brackets over the cab and engaged with said foot member.

2. The invention of claim 1, wherein:

each of said sleeves has screw connection means associated therewith to releasably engage the bar members;

said screw connection means; including blocks fixedly secured to the rail members and sleeves, the blocks having threaded openings formed therein, said threaded openings extending into the respective rail members and sleeves; being threadedly engaged into said blocks and extending inwardly to engage the shaft and the bar members, respectfully.

* * * * *